United States Patent
Hattori

(10) Patent No.: US 7,742,552 B1
(45) Date of Patent: *Jun. 22, 2010

(54) SPREAD SPECTRUM CLOCK GENERATOR WITH CONTROLLED DELAY ELEMENTS

(75) Inventor: Hide Hattori, Palo Alto, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/077,282

(22) Filed: Mar. 17, 2008

Related U.S. Application Data

(63) Continuation of application No. 10/783,338, filed on Feb. 20, 2004, now Pat. No. 7,346,095.

(51) Int. Cl.
H04L 7/06 (2006.01)
H04L 7/00 (2006.01)

(52) U.S. Cl. .................. 375/364; 713/401

(58) Field of Classification Search .......... 375/130, 375/139, 354, 364; 710/23, 25, 26; 711/109; 713/375, 400, 401, 500–502, 600, 601
See application file for complete search history.

(56) References Cited

U.S. PATENT DOCUMENTS

| | | | |
|---|---|---|---|
| 5,488,627 A | 1/1996 | Hardin et al. | 375/204 |
| 5,631,920 A | 5/1997 | Hardin | 375/200 |
| 5,867,524 A | 2/1999 | Booth et al. | 375/200 |
| 5,872,807 A | 2/1999 | Booth et al. | 375/200 |
| 6,643,317 B1 | 11/2003 | Blumer | 375/130 |
| 6,647,052 B2 | 11/2003 | Hailey | 375/130 |
| 6,665,019 B1 | 12/2003 | Pronkine | 348/540 |
| 6,788,156 B2 * | 9/2004 | Tam et al. | 331/49 |

* cited by examiner

*Primary Examiner*—Young T. Tse
(74) *Attorney, Agent, or Firm*—Imperium Patent Works; Darien K. Wallace

(57) ABSTRACT

A programmable spread spectrum clock generator (SSCG) reduces electromagnetic interference by spreading the frequency bandwidth of an output signal. The rate at which the frequency of the output signal changes, as well as other aspects of the output signal, are software programmable. The programmable SSCG receives a periodic signal whose cycles have substantially identical periods and outputs the output signal whose cycles have periods that vary smoothly over a plurality of cycles of the periodic signal. The programmable SSCG generates a control signal using the periodic signal. The programmable SSCG includes a variable delay element that generates the output signal by delaying the periods of the periodic signal based on the magnitude of the control signal. The output signal is generated without using a phase locked loop. Moreover, successive cycles of the output signal rarely have identical periods.

17 Claims, 7 Drawing Sheets

SPREAD SPECTRUM CLOCK GENERATOR WITH CONTROLLED DELAY ELEMENTS

CROSS REFERENCE TO RELATED APPLICATION

This application is a continuation of, and claims priority under 35 U.S.C. §120 from, nonprovisional U.S. patent application Ser. No. 10/783,338 entitled "Spread Spectrum Clock Generator with Controlled Delay Elements," filed on Feb. 20, 2004, now U.S. Pat. No. 7,346,095, the subject matter of which is incorporated herein by reference.

TECHNICAL FIELD

The present invention relates generally to reducing electromagnetic emissions by electronic circuits and, in one example, to spread spectrum clock circuits used to reduce peak emissions of electromagnetic interference.

BACKGROUND

A clocked electronic circuit (for example, a microprocessor) often radiates electromagnetic energy at the frequency of a clock signal that clocks the electronic circuit. The electronic circuit also typically radiates electromagnetic energy at the frequencies of harmonics of the frequency of the clock signal. Power leads and long traces on a printed circuit board can act as antennas to radiate electromagnetic energy. Such electromagnetic energy emitted by one electronic device can be received by another electronic device and can interfere with the operation of the other electronic device. The radiated electromagnetic energy is therefore sometimes called electromagnetic interference (EMI). Thus, the Federal Communications Commission regulates the maximum allowable emission of EMI by electronic consumer devices.

Manufacturers of electronic devices use various methods to reduce emission of EMI. One method involves shielding the electronic circuits that emit the EMI. Shielding circuits with a metal casing, however, can be costly. Moreover, EMI can escape through openings in a metal shield. Another method of reducing EMI involves reducing the length of signal paths that carry clock signals. It is often not feasible, however, significantly to reduce the length of all signal paths that carry clock signals. Finally, the undesirable effects of EMI can be reduced by spreading out the frequency bandwidth of a clock signal in order to decrease the peak emission level of EMI. Spreading out the frequency bandwidth of a clock signal is sometimes referred to as "spread spectrum clocking." For example, spread spectrum clocking can be used to reduce the peak EMI levels emitted from an electronic consumer device so that the EMI levels are within maximum levels permitted by the Federal Communications Commission.

One existing method for spread spectrum clocking is described in U.S. Pat. No. 5,488,627, in which a spread spectrum output clock is generated by a spread spectrum clock generator that includes a phase locked loop (PLL). One problem with PLL spread spectrum clock generators is that they typically include loop filter capacitors. Loop filter capacitors are typically large and costly to realize in integrated circuit form.

Another problem with PLL spread spectrum clock generators is the resulting reduction in processing throughput of the microprocessor that is clocked by the spread spectrum clock signal. Microprocessors typically have maximum allowable clock frequencies. A microprocessor may fail if the clock signal is increased beyond the maximum frequency. For many applications, it is desired to operate the microprocessor with the highest frequency clock signal possible in order to maximize microprocessor processing throughput. In order to perform the spread spectrum clock generation, however, the frequency of the clock signal is dithered between the maximum frequency and a lesser frequency. The average clock frequency is therefore lower than the maximum clock frequency. The result is an undesired reduction in microprocessor throughput.

Due to the interest in maximizing processing throughput, spread spectrum clocking of a microprocessor may be practiced by varying the frequency of the clock signal just enough to bring the peak EMI levels within the maximum permitted levels, while at the same time maintaining the fastest possible average clock frequency. Consequently, it is desirable to control the variations in the frequency of the spread spectrum clock.

One existing method for controlling the variations in the frequency of a spread spectrum clock signal involves switching between a plurality of delayed clock signals. FIG. 1 (prior art) shows a spread spectrum system 10 as described in U.S. Pat. No. 6,643,317. Spread spectrum clock system 10 includes a clock signal generator 11, a state machine 12 and a multiplexer 13. Clock signal generator 11 outputs a primary clock signal 14, and multiplexer 13 outputs a spread spectrum signal 15. The output of clock signal generator 11 is coupled to state machine 12 and to a data input lead of multiplexer 13, as well as to delay lines 16-18 through delay line N 19. The output of state machine 12 is coupled to a select input lead of multiplexer 13. Each of delay lines 16-18 through delay line N 19 outputs a signal that is delayed to a different degree. The outputs of delay lines 16-19 are coupled to data input leads of multiplexer 13. Based on primary clock signal 14, state machine 12 generates a select signal 20 that causes multiplexer 13 to switch between primary clock signal 14 and the delayed signals from delay lines 16-19. In this manner, spread spectrum signal 15 is generated from signals that are delayed by discrete amounts. For additional information, see U.S. Pat. No. 6,643,317.

Generating a spread spectrum clock signal by switching between signals having different, discrete frequencies can produce unwanted frequency components in the spread spectrum clock signal. A method is sought for generating a spread spectrum clock signal that does not involve a phase locked loop and that does not rely on discrete delayed signals.

SUMMARY

A programmable spread spectrum clock generator (SSCG) receives a periodic signal whose cycles have substantially identical periods and outputs an output signal whose cycles have periods that vary smoothly over a plurality of cycles of the periodic signal. The programmable SSCG reduces electromagnetic interference (EMI) by spreading out the frequency bandwidth of the output signal.

The programmable SSCG includes a variable delay element. The variable delay element has an input lead upon which the periodic signal is received. The variable delay element has an output lead onto which the output signal is supplied. The propagation delay through the variable delay element from the input lead to the output lead is a function of the magnitude of a control signal.

The programmable SSCG uses the periodic signal to generate the control signal. The magnitude of the control signal is changed to change the frequency of the output signal in a desired manner. Successive cycles of the output signal rarely have identical periods.

In one embodiment, the DC offset of the control signal is programmable by writing to a first plurality of the bits in a programmable spread spectrum control register, the rate at which the control signal changes is programmable by writing to a second plurality of the bits stored in the programmable spread spectrum control register, and the period of the control signal is programmable by writing to a third plurality of the bits in the programmable spread spectrum register.

In some embodiments, the programmable SSCG includes a programmable spread spectrum control register, a counter portion, an analog integrator and biasing circuit, but does not include a phase locked loop. The programmable SSCG also includes a non-linear signal generator that converts an intermediary signal, whose magnitude varies linearly over a plurality of cycles of the periodic signal, into a non-linear signal, whose magnitude varies in a quasi-sinusoidal manner over the plurality of cycles. The non-linear signal is then used to generate the control signal so that the control signal also varies somewhat sinusoidally in magnitude over the plurality of cycles of the periodic signal.

In another embodiment, an integrated circuit comprises a processor, an input lead, a spread spectrum clock generator, and a programmable bit that is writable by the processor. The spread spectrum clock generator receives a clock signal from the input lead and outputs a delayed clock signal to the processor. If a first digital logic value is stored in the programmable bit, then the delayed clock signal has a substantially constant frequency, whereas if a second digital logic value is stored in the programmable bit, then the delayed clock signal has a variably dithered frequency. In one aspect, the integrated circuit is a microcontroller integrated circuit.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
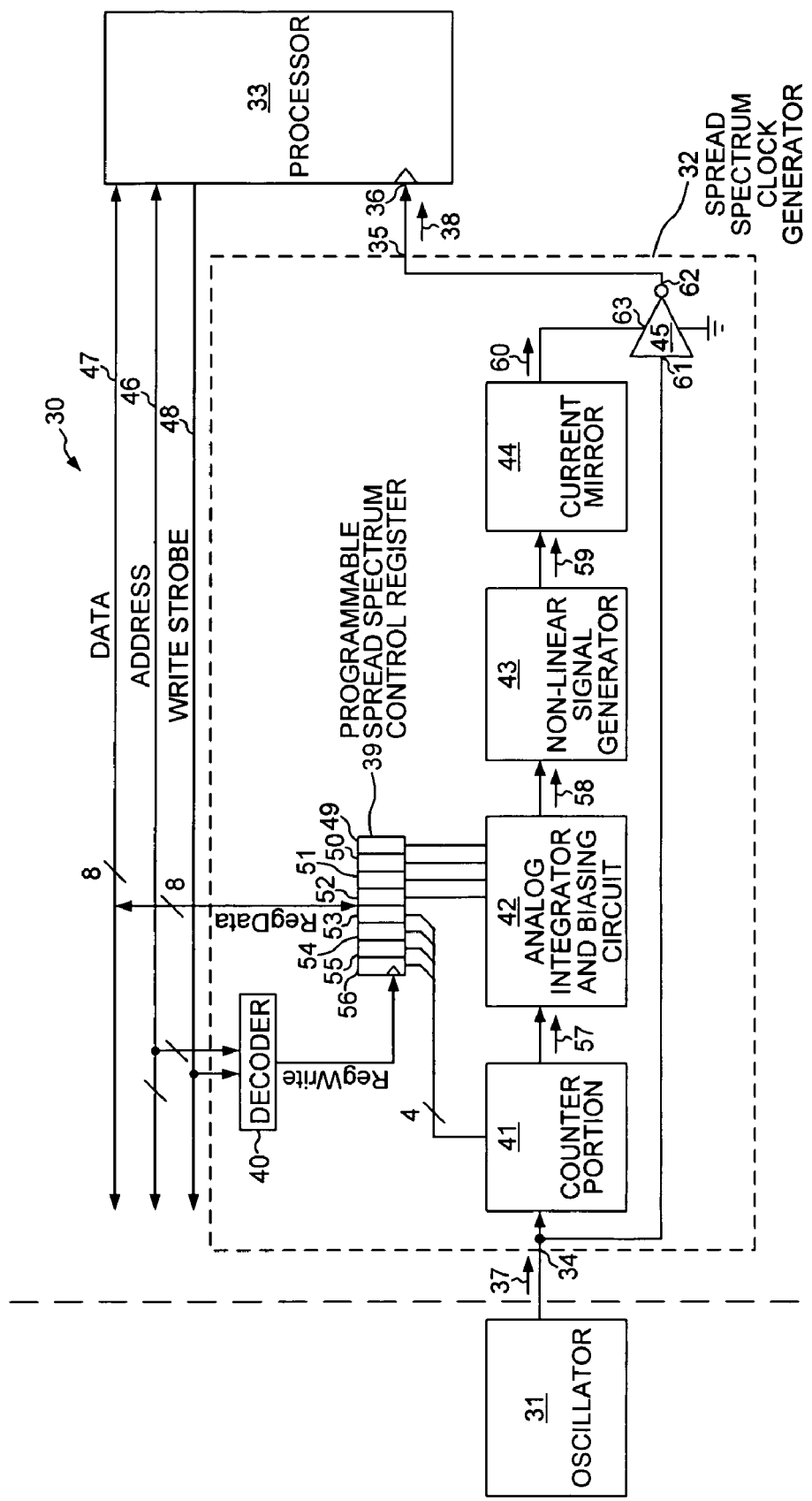
FIG. 2 is a simplified, schematic diagram of a spread spectrum system according to an embodiment of the invention.

FIG. 2 shows a spread spectrum system 30 for reducing electromagnetic interference (EMI). The spread spectrum system 30 dithers a periodic signal (for example, a clock signal) to generate an output signal. The frequency bandwidth of the output signal is wider than the frequency bandwidth of the periodic signal. By spreading the frequency bandwidth of the output signal, the amplitudes of EMI components at each harmonic of the periodic signal are reduced.

Spread spectrum system 30 includes an oscillator 31, a programmable spread spectrum clock generator (SSCG) 32 and a processor 33. An input lead 34 of programmable SSCG 32 is coupled to oscillator 31. An output lead 35 of programmable SSCG 32 is coupled to a clock input lead 36 of processor 33. Oscillator 31 generates a periodic signal 37 that is received onto input lead 34 of programmable SSCG 32. Programmable SSCG 32 generates an output signal 38 by spreading the frequency bandwidth of periodic signal 37. Programmable SSCG 32 allows the degree and manner in which the frequency bandwidth of periodic signal 37 is spread to be controlled. Programmable SSCG 32 outputs output signal 38 onto output lead 35. Output signal 38 is received onto clock input lead 36 and clocks processor 33.

SSCG 32 includes a programmable spread spectrum control register 39, an address decoder 40, a counter portion 41, an analog integrator and biasing circuit 42, a non-linear signal generator 43, a current mirror 44 and a variable delay element 45. In the specific embodiment of FIG. 2, programmable spread spectrum control register 39 is an eight-bit register. Processor 33 can write to register 39 by outputting the address of spread spectrum control register 39 onto an address bus 46 of processor 33. Processor 33 outputs the data to be written into spread spectrum control register 39 onto a data bus 47 and then outputs a write strobe signal onto write strobe output line 48. The data in spread spectrum control register 39 controls the degree and manner in which the frequency of periodic signal 37 is spread out. Address decoder 40 generates a write strobe signal RegWrite when it detects the address of spread spectrum control register 39 being present on address bus 46 at the same time that the write strobe is detected on write strobe line 48. When the write strobe signal RegWrite is supplied to spread spectrum control register 39, the data on data bus 47 is clocked into spread spectrum control register 39.

The first two bits 49-50 of spread spectrum control register 39 (the DC offset control bits) control the DC offset of control signal 60. Thus, DC offset control bits 49-50 also control the average propagation delay through variable delay element 45. The contents of offset control bits 49-50 is provided to analog integrator and biasing circuit 42.

The third and fourth bits 51-52 of spread spectrum control register 39 (the slope control bits) control the slope of control signal 60. Thus, slope control bits 51-52 also control the rate at which the frequency of output signal 38 changes. The contents of slope control bits 51-52 is provided to analog integrator and biasing circuit 42.

Bits five through eight 53-56 of spread spectrum control register 39 (the dither rate control bits) control the period or time duration of cycles of control signal 60. Thus dither rate control bits 53-56 also control the time it takes the frequency of output signal 38 to vary from its maximum frequency to its minimum frequency. The contents of dither rate control bits 53-56 is provided to counter portion 41.

Counter portion 41 receives periodic signal 37 from oscillator 31 and outputs a divided signal 57. Periodic signal 37 is also received by variable delay element 45. Analog integrator and biasing circuit 42 receives divided signal 57 from counter portion 41 and outputs an intermediary signal 58. The propagation delay through variable delay element 45 is varied by varying the magnitude of intermediary signal 58. Non-linear signal generator 43 receives intermediary signal 58 and outputs a non-linear signal 59, which is received by current mirror 44. Current mirror 44 outputs a control signal 60 whose magnitude is a function of the magnitude of non-linear signal 59.

Variable delay element 45 has a data input lead 61, a data output lead 62 and a control input lead 63. Variable delay element 45 receives periodic signal 37 on data input lead 61 and outputs output signal 38 on data output lead 62. Variable delay element 45 also receives control signal 60 on control lead 63. The relationship of the magnitude of control signal 60 with respect to the propagation delay through variable delay element 45 is proportional, but is not necessarily a linear relationship. By decreasing the magnitude of control signal 60, the propagation delay through variable delay element 45 is increased, thereby lengthening the time duration of a cycle of output signal 38. By increasing the magnitude of control signal 60, the propagation delay through variable delay element 45 is decreased, thereby shortening the time duration of a cycle of output signal 38.

Figure 3:
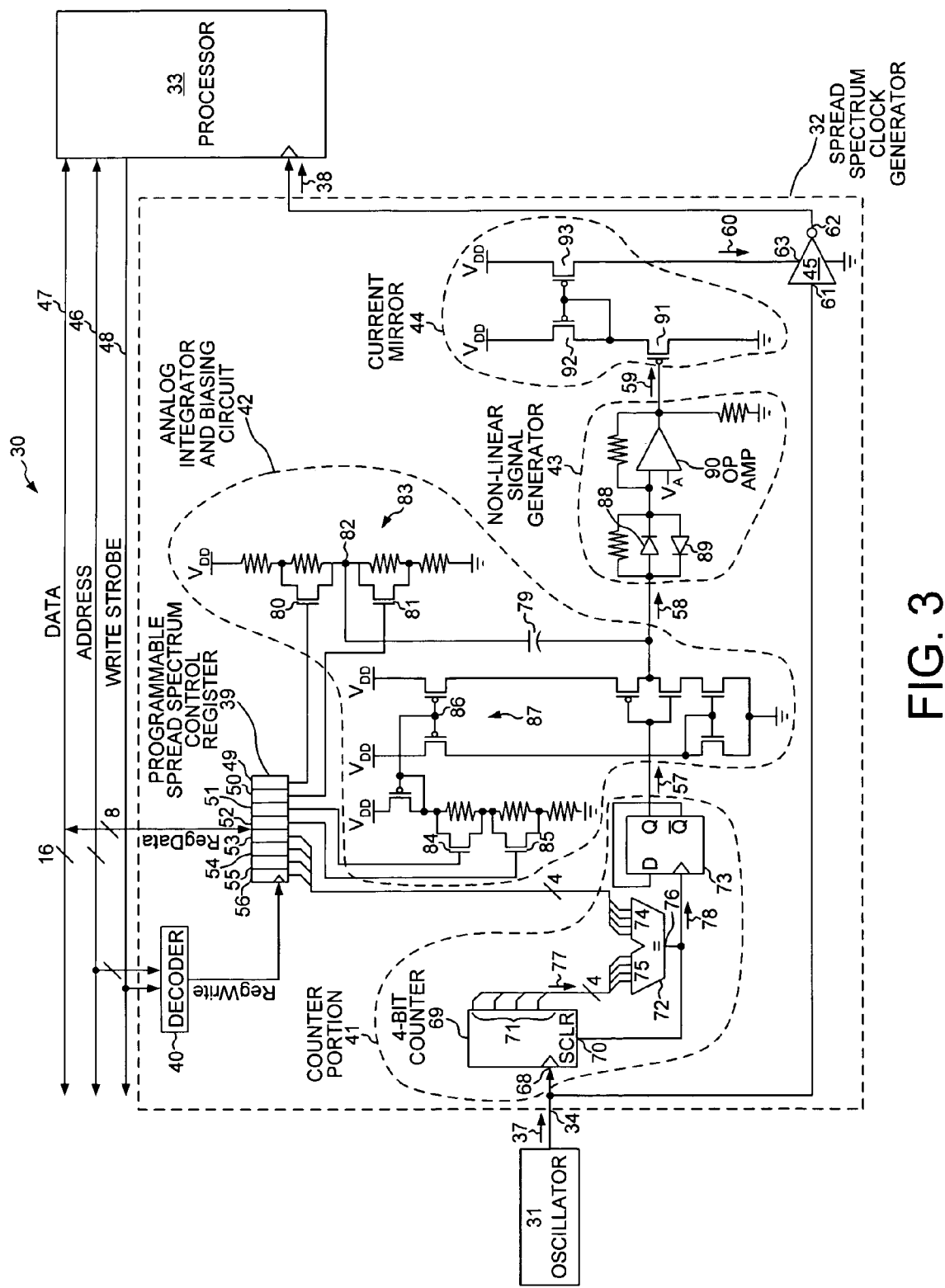
FIG. 3 is a more detailed diagram of the spread spectrum system of FIG. 2.
Figure 4:
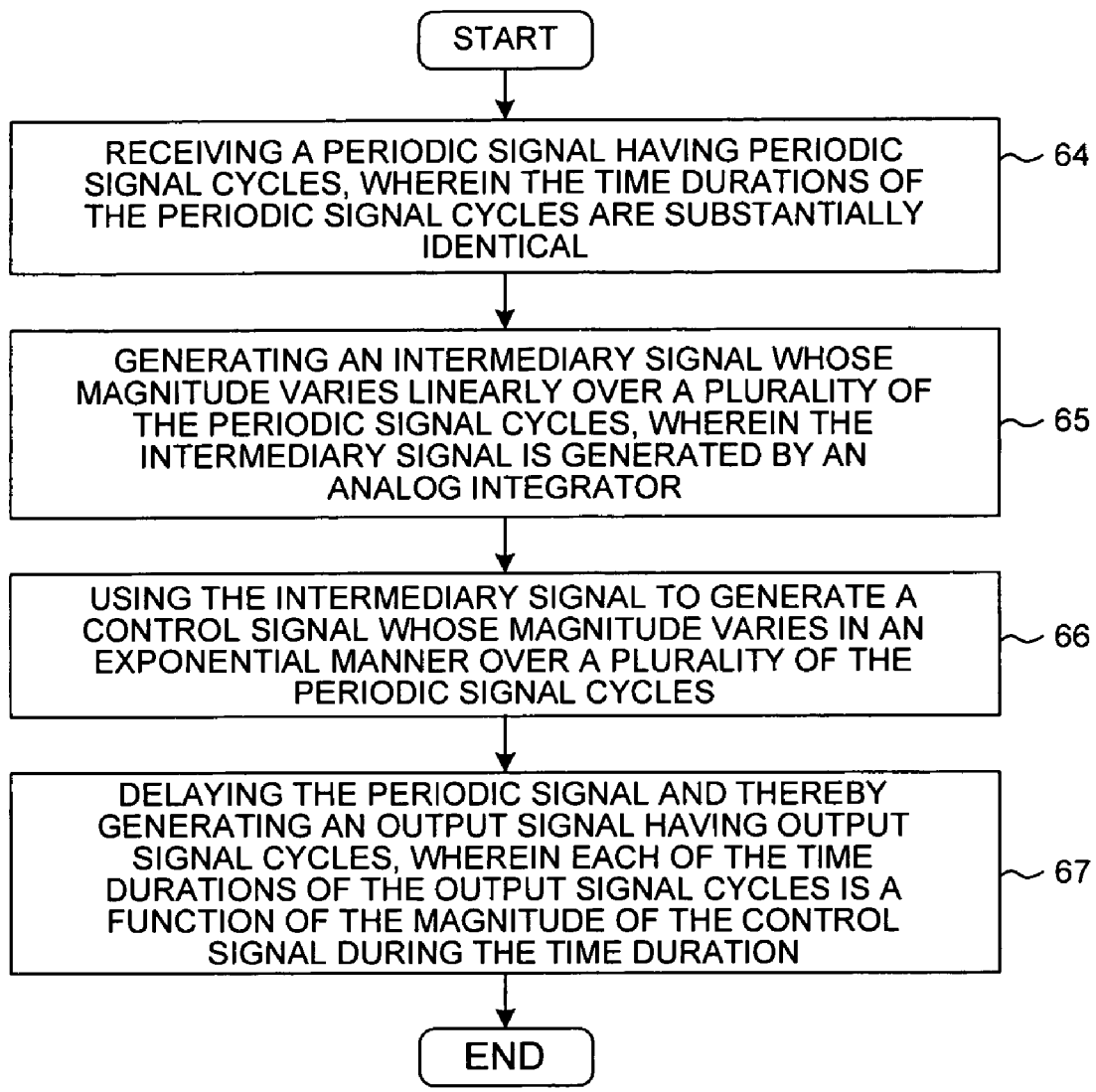
FIG. 4 is a flowchart of steps for delaying the time durations of cycles of a periodic signal in order to decrease peak emission level of electromagnetic interference.

FIG. 3 is a more detailed diagram of spread spectrum system 30. FIG. 4 is a flowchart showing steps by which spread spectrum system 30 can advantageously generate output signal 38 by spreading out the frequency bandwidth of periodic signal 37 to reduce the peak EMI levels emitted from circuits, such as processor 33, that are clocked by output signal 38. The operation of individual elements of spread spectrum system 30, as shown in FIG. 3, is explained in detail in connection with the steps listed in FIG. 4.

Initially, in a step 64 of FIG. 4, periodic signal 37 is received onto input lead 34 of programmable SSCG 32. Input lead 34 is coupled to data input lead 61 of variable delay element 45, as well as to a clock input lead 68 of a four-bit counter 69 of counter portion 41, as shown in FIG. 3. Counter 69 also has a synchronous clear lead 70 and four count output leads 71. Besides counter 69, counter portion 41 includes a digital comparator 72 and a flip-flop 73. Comparator 72 has first value input leads 74, second value input leads 75 and an output lead 76. The contents of dither rate control bits 53-56 of spread spectrum control register 39 is provided to first value input leads 74 of comparator 72. In this example, the digital value eight [1000] is written into dither rate control bits 53-56 and is provided to first value input leads 74.

Figure 5:
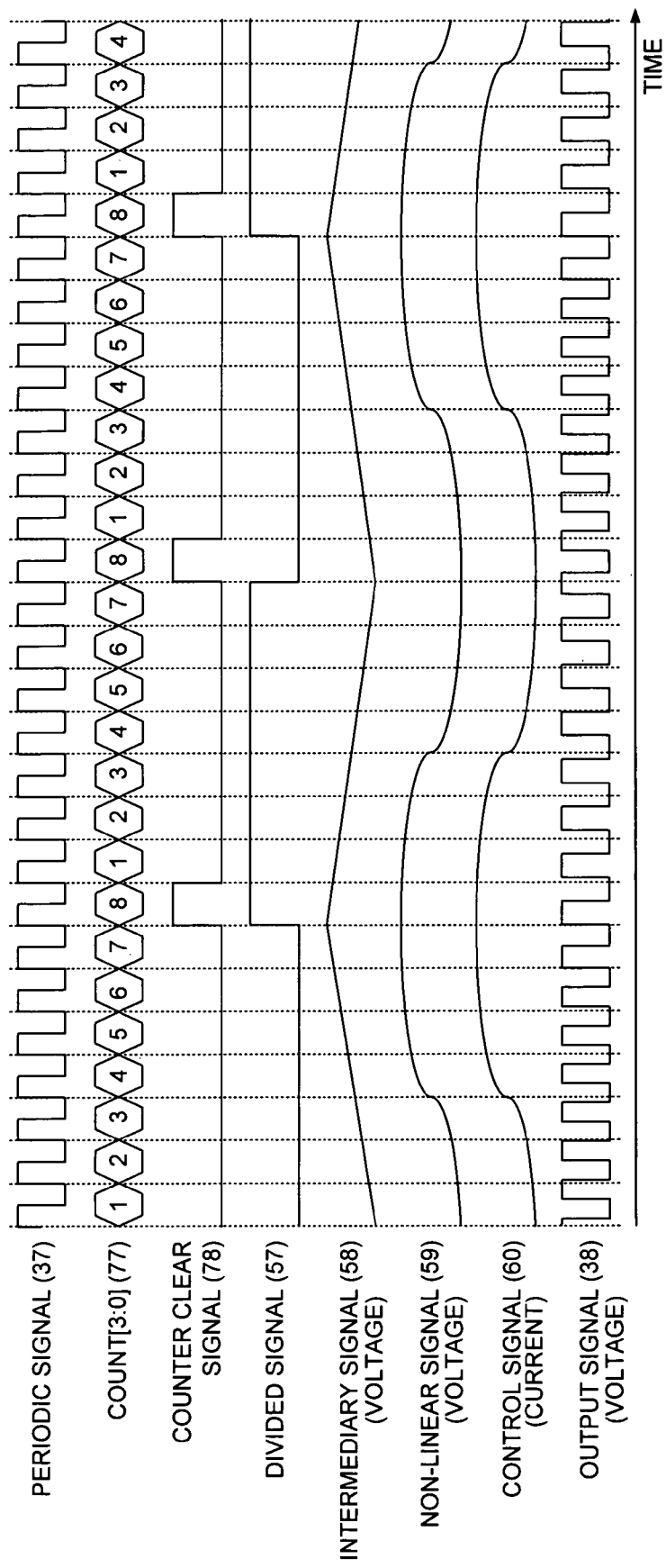
FIG. 5 is a waveform diagram illustrating the operation of the spread spectrum system of FIG. 2. The waveforms of FIG. 5 are not precise, but absolute understanding of the operation of the circuit is not necessary in order to practice the invention. If more precise waveforms are desired, the circuit can be simulated using a circuit simulation program such as SPICE.

FIG. 5 illustrates the waveforms present on various nodes of spread spectrum system 30. Together with the circuit diagram of FIG. 3 and the flowchart of steps of FIG. 4, the waveforms of FIG. 5 illustrate the operation of programmable SSCG 32. Still at step 64 of FIG. 4, periodic signal 37 is received onto clock input lead 68 of counter 69. As shown in FIG. 5, periodic signal 37 has cycles whose time durations (also called periods) are substantially identical. Periodic signal 37 may, for example, be a clock signal output by a crystal oscillator.

Counter 69 outputs a four-bit count[3:0] 77 onto count output leads 71, which are coupled to second value input leads 75 of comparator 72. Comparator 72 outputs a counter clear signal 78. When count[3:0] 77 on second value input leads equals 75 equals the value on first value input leads 74, counter clear signal 78 is asserted. Counter clear signal 78 is received on synchronous clear lead 70 of counter 69, as well as on the clock input of flip-flop 73. In this example, where the digital value eight [1000] is provided to first value input leads 74, counter clear signal 78 is asserted at count eight and restarts the counting, as shown in FIG. 5. Flip-flop 73 outputs divided signal 57, which is alternately asserted and deasserted each time counter clear signal 78 is asserted. Thus, divided signal 57 has half as many pulses as counter clear signal 78.

In a step 65 of FIG. 4, analog integrator and biasing circuit 42 receives divided signal 57 from flip-flop 73 of counter portion 41, and charges and discharges an integrating capacitor 79, thereby generating a saw-tooth-shaped intermediary signal 58, as shown in FIG. 5. Integrating capacitor 79 can be smaller than, for example, the capacitor in a low-pass filter of a phase locked loop. As seen in FIG. 5, the voltage magnitude of intermediary signal 58 varies substantially linearly over a plurality of cycles of periodic signal 37. In the example of FIG. 5, the voltage magnitude of intermediary signal 58 varies substantially linearly over eight cycles of periodic signal 37.

The contents of offset control bits 49-50 in programmable spread spectrum control register 39 is provided to gate leads of two transistors 80-81 of analog integrator and biasing circuit 42. By turning transistors 80-81 on or off, the DC bias voltage on node 82 of voltage divider 83 can be controlled. By decreasing the bias voltage at node 82 such that the average voltage of intermediary signal 58 decreases, the average propagation delay through variable delay element 45 is increased. By increasing the bias voltage at node 82 such that the average voltage of intermediary signal 58 increases, the average propagation delay through variable delay element 45 is decreased.

The contents of slope control bits 51-52 is provided to gate leads of two transistors 84-85 of analog integrator and biasing circuit 42. By turning transistors 84-85 on or off, the voltage on a node 86 is set. By setting the voltage on node 86, the current passing through current mirror 87 is set, thereby determining the slope of intermediary signal 58. By decreasing the voltage on node 86, the current passing through mirror 87 is increased, thereby increasing the slope of intermediary signal 58 and thereby increasing the rate of change of the frequency of output signal 38. By increasing the voltage on node 86, the current passing through current mirror 87 is decreased, thereby decreasing the slope of intermediary signal 58 and thereby decreasing the rate of change of the frequency of output signal 38.

In the specific embodiment of FIG. 3, intermediary signal 58 is a voltage signal, and the propagation delay through variable delay element 45 is a function of the magnitude of the voltage amplitude of the intermediary signal. In other embodiments, intermediary signal 58 is a current signal, and the propagation delay through variable delay element 45 is a function of the magnitude of the current amplitude of the intermediary signal.

Non-linear signal generator 43 receives intermediary signal 58 that is output by current mirror 87 of analog integrator and biasing circuit 42. Non-linear signal generator 43 uses intermediary signal 58 to generate non-linear signal 59. Non-linear signal generator 43 includes two diodes 88-89, an operational amplifier 90 and various resistors. As shown in FIG. 5, non-linear signal generator 43 converts triangular-wave-shaped intermediary signal 58, whose magnitude varies substantially linearly over a plurality of cycles of periodic signal 37, into non-linear signal 59, whose magnitude varies approximately in an exponential manner over the plurality of cycles. In other embodiments, non-linear signal generator 43 converts triangular-wave-shaped intermediary signal 58 into a non-linear signal, whose magnitude varies in a somewhat sinusoidal manner over the plurality of cycles.

Figure 6:
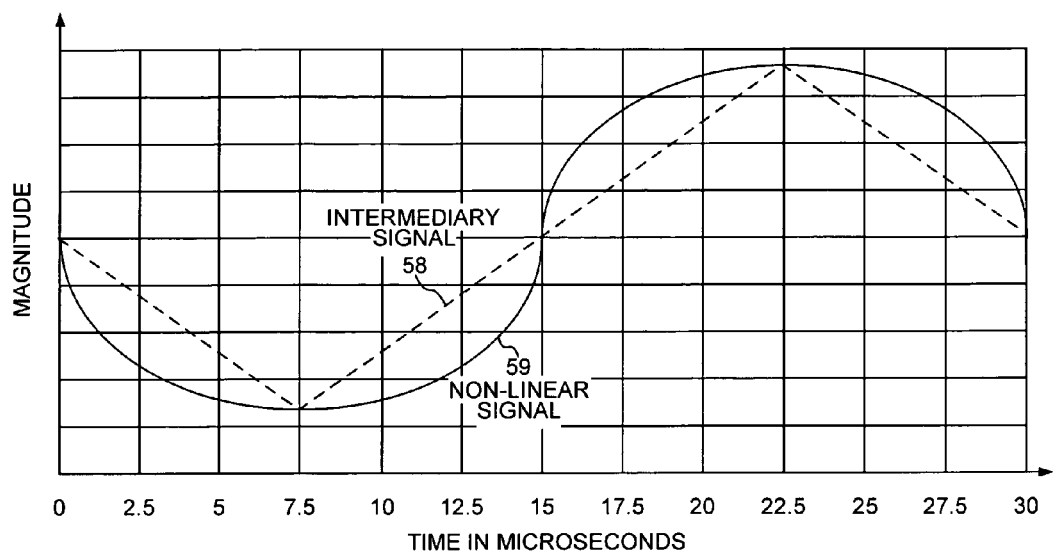
FIG. 6 is a waveform diagram showing one cycle of each of an intermediary signal and a non-linear signal of the spread spectrum system of FIG. 2.

FIG. 6 is a waveform diagram showing an example of one cycle of triangular-wave-shaped intermediary signal 58 generated by programmable SSCG 32 for one specific bit configuration of spread spectrum control register 39. In the example of FIG. 6, intermediary signal 58 has a frequency of thirty kHz and was generated from periodic signal 37 having a frequency of about twenty MHz. Thus, the magnitude of intermediary signal 58 varies linearly from its minimum voltage amplitude at time 7.5 microseconds to its maximum voltage amplitude at time 22.5 microseconds over about 300 cycles of periodic signal 37.

FIG. 6 also shows one cycle of non-linear signal 59 generated from intermediary signal 58 by non-linear signal generator 43. In the example of FIG. 6, the voltage magnitude of non-linear signal 59 varies in an exponential manner from its minimum voltage amplitude at time 7.5 microseconds to its maximum voltage amplitude at time 22.5 microseconds over about 300 cycles of periodic signal 37.

In a step 66 of FIG. 4, current mirror 44 generates control signal 60 using non-linear signal 59. Current mirror 44 mirrors intermediary signal 58 such that the current magnitude of control signal 60 varies in an exponential manner over a plurality of cycles of periodic signal 37. Current mirror 44 includes three transistors 91-93. Current passing through transistor 93 becomes control signal 60 and is received by control input lead 63 of variable delay element 45.

In a step 67 of FIG. 4, variable delay element 45 generates output signal 38 by variably delaying the cycles of periodic signal 37. Variable delay element 45 receives periodic signal 37 on data input lead 61 and, based on the magnitude of control signal 60, varies the time durations of cycles of periodic signal 37 to generate output signal 38. Variable delay element 45 decreases the time durations of cycles of periodic signal 37 in approximate proportion to the decrease in magnitude of the current of control signal 60.

Figure 7:
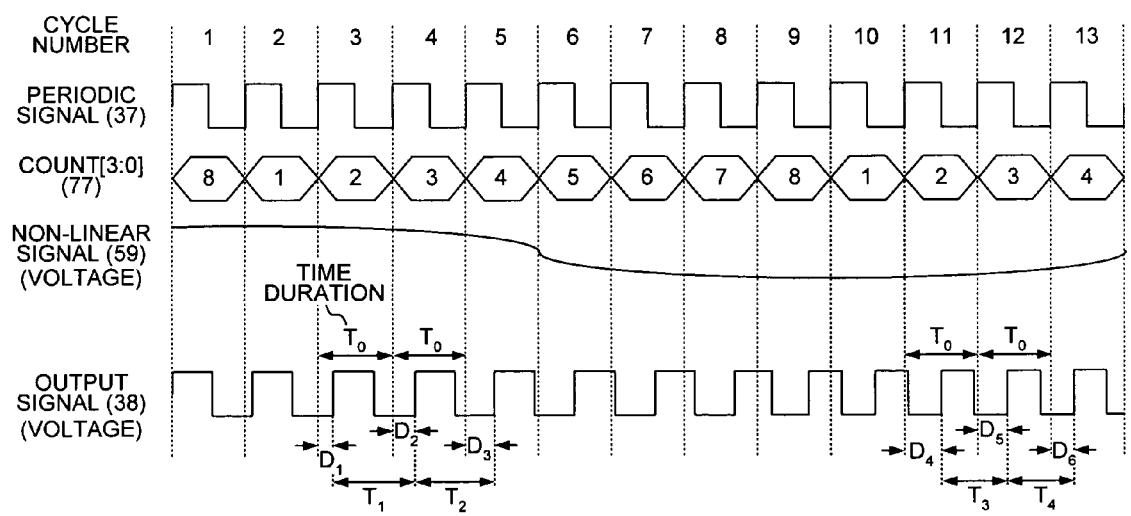
FIG. 7 is a more detailed waveform diagram illustrating several cycles of four waveforms of FIG. 5.

FIG. 7 illustrates how variable delay element 45 varies the time durations of cycles of periodic signal 37 to generate output signal 38 by showing four waveforms of FIG. 5 in more detail. FIG. 7 shows the four waveforms during thirteen illustrative cycles of periodic signal 37. The time durations of the periodic signal cycles are substantially identical. In an example of increasing time durations of cycles of output signal 38, the leading edge of cycle number three of periodic signal 37 has been delayed by a time $D_1$, the leading edge of cycle number four has been delayed by a time $D_2$, and the leading edge of cycle number five has been delayed by a time $D_3$. Therefore, a time duration $T_1$ of cycle number three of output signal 38 equals a time duration $T_0$ of cycle number three of periodic signal 37 plus time $D_2$ minus time $D_1$. Likewise, a time duration $T_2$ of cycle number four of output signal 38 equals the time duration $T_0$ of cycle number four of periodic signal 37 plus time $D_3$ minus time $D_2$. Thus, $T_2-T_1=D_3-2D_2+D_1$. Here, $D_3-2D_2+D_1$ is greater than zero, and the time duration of successive cycles is increasing. Consequently, the frequency of output signal 38 is decreasing.

In an example of decreasing time durations of cycles of output signal 38, the leading edge of cycle number eleven of periodic signal 37 has been delayed by a time $D_4$, the leading edge of cycle number twelve has been delayed by a time $D_5$, and the leading edge of cycle number thirteen has been delayed by a time $D_6$. Therefore, a time duration $T_3$ of cycle number eleven of output signal 38 equals the time duration $T_0$ of cycle number eleven of periodic signal 37 plus time $D_5$ minus time $D_4$. Likewise, a time duration $T_4$ of cycle number twelve of output signal 38 equals the time duration $T_0$ of cycle number twelve of periodic signal 37 plus time $D_6$ minus time $D_5$. Thus, $T_4-T_3=D_6-2D_5+D_4$. Here, $D_6-2D_5+D_4$ is less than zero, and the time duration of successive cycles is decreasing. Consequently, the frequency of output signal 38 is increasing.

Programmable SSCG 32 varies the magnitude of non-linear signal 59 such that the change in magnitude during each successive cycle of periodic signal 37 either increases or decreases. This is accomplished where the change in magnitude of non-linear signal 59 conforms to a sinusoidal, quasi-sinusoidal, exponential or higher-order function. If the additional incremental change in magnitude during each successive cycle of periodic signal 37 is the same, i.e., linear change, then $(D_2-D_1)=(D_3-D_2)$. Consequently, $T_2-T_1=D_3-2D_2+D_1=0$ and $T_4-T_3=D_6-2D_5+D_4=0$. For example, if the magnitude of non-linear signal 59 during each successive cycle of periodic signal 37 were to increase by the same incremental amount (i.e., linearly by an additional five nanoseconds per cycle), the output signal cycles would all have the same time duration, and no spread spectrum clock signal would be generated. To avoid this situation, signal 59 is a non-linear signal and not a linear signal.

FIG. 7 also shows in more detail that the voltage magnitude of non-linear signal 59 varies smoothly between cycle number two and cycle number nine of periodic signal 37, albeit with an inflection point between cycles five and six. Consequently, the time durations of cycles of output signal 38 vary smoothly over these cycles. Successive cycles of output signal 38 rarely have identical periods, with the exception of perhaps a couple successive cycles at either the top (between cycles one and two) or bottom (between cycles nine and ten) of the exponential voltage waveform of non-linear signal 59. Over the approximately 300 cycles of periodic signal 37 between time 7.5 microseconds and time 22.5 microseconds in FIG. 6, for example, only a few cycles of output signal 38 would have identical time durations.

Figure 8:
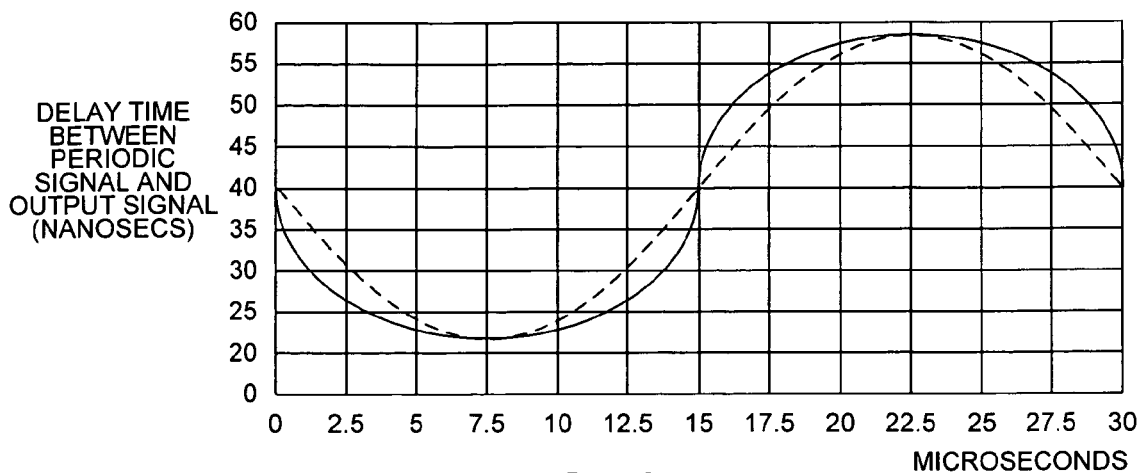
FIG. 8 is a graph illustrating the delay time by which a variable delay element delays leading edges of a periodic signal.

FIG. 8 is a graph illustrating the delay time by which variable delay element 45 delays each leading edge of periodic signal 37 in an example where periodic signal 37 has a frequency of about 20 MHz and counter clear signal 78 has a frequency of about thirty-three kHz. In this example, each leading edge of periodic signal 37 is delayed by more than 20 nanoseconds, and the average delay is 40 nanoseconds. Between time 7.5 microseconds and time 22.5 microseconds, the rate of increase of delay increases at first and then decreases. The magnitude of control signal 60 generated by programmable SSCG 32 varies smoothly over a plurality of cycles of periodic signal 37 regardless of whether the embodiment of programmable SSCG 32 generates a quasi-sinusoidal, exponential or higher-order non-linear signal 59. FIG. 8 also shows the delay time by which variable delay element 45 delays each leading edge of periodic signal 37 in an embodiment than generates a quasi-sinusoidal non-linear signal 59. The dashed curve indicates the quasi-sinusoidal characteristic of the delay time.

Figure 9:
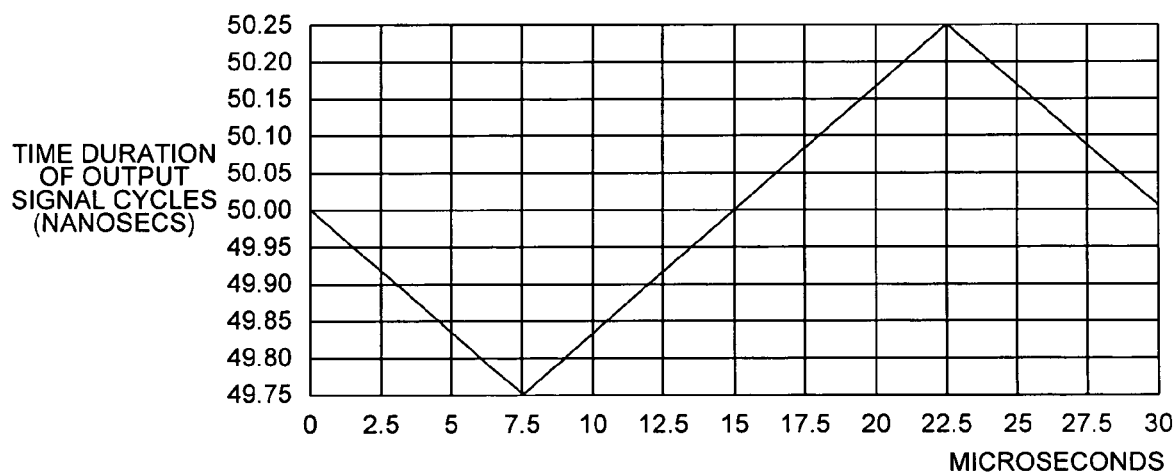
FIG. 9 is a graph illustrating the change in time durations of cycles of an output signal in one embodiment.

FIG. 9 is a graph illustrating the change in time durations of cycles of output signal 38 over time in an embodiment of programmable SSCG 32 that generates a quasi-sinusoidal non-linear signal 59. The change in time durations shown in FIG. 9 results when periodic signal 37 has a frequency of about 20 MHz and counter clear signal 78 has a frequency of about thirty-three kHz. The time durations of output signal 38 vary smoothly from about 49.75 nanoseconds at time 7.5 microseconds to about 50.25 nanoseconds at time 22.5 microseconds. The change in frequency of output signal 38 varies proportionally to the change in time durations. Thus, the frequency of output signal 38 is dithered about ±0.5% around an average time duration of fifty nanoseconds. The inflection points in the change in time durations at time 7.5 microseconds and time 22.5 microseconds can be softened by embodiments of programmable SSCG 32 that generate higher order non-linear signals.

Figure 1:
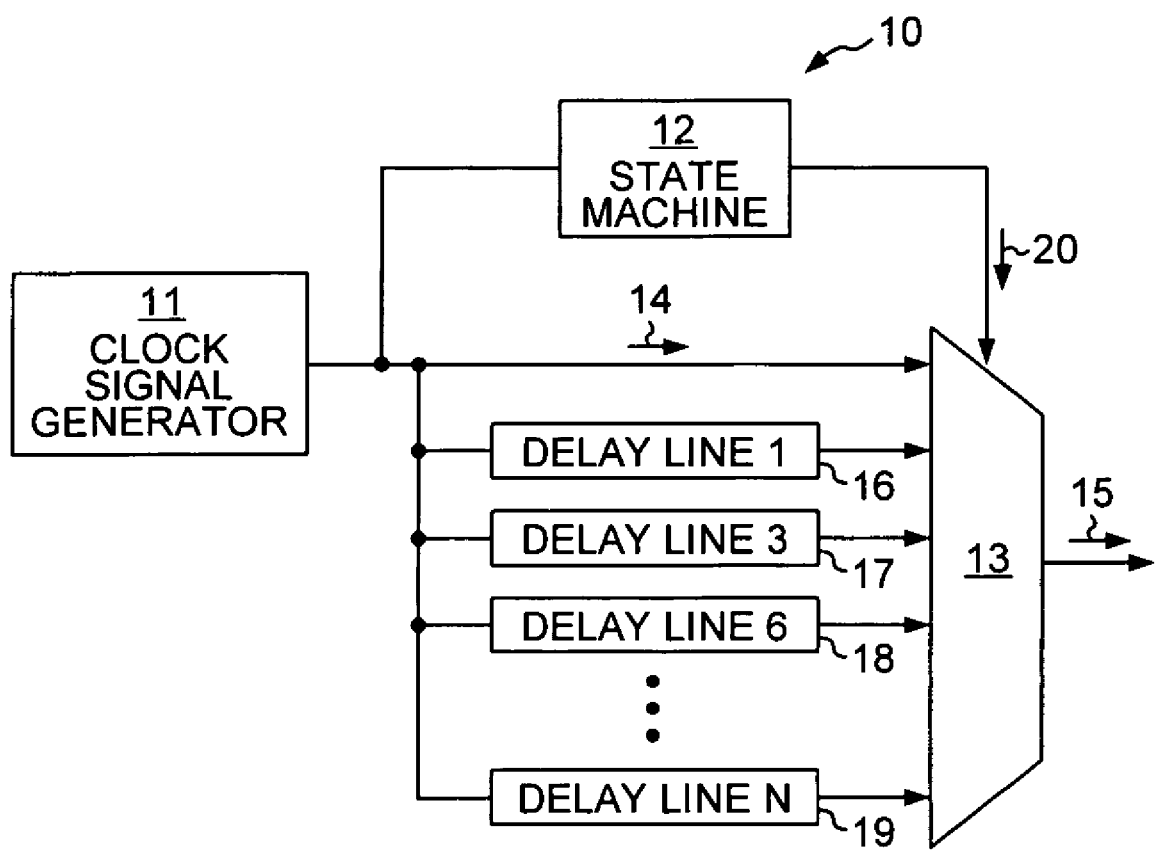
FIG. 1 (prior art) is a simplified, schematic diagram of a spread spectrum system that generates a spread spectrum clock from discrete delayed signals.

In contrast to programmable SSCG 32, spread spectrum clock generators that switch between a plurality of delayed clock signals, such as the one shown in FIG. 1 (prior art), generate output signals wherein a plurality of successive cycles of the output signal have substantially identical time durations.

Microprocessors typically have maximum allowable clock frequencies. The degree to which a clock frequency is dithered usually depends on the application for which the microprocessor is used. For a low-noise application, the frequency of output signal 38 might be varied by up to ±5%. On the other hand, where a high operating speed is more crucial, the frequency of output signal 38 might be varied by only ±0.1%.

In one embodiment, a facility to enable and disable the programmable SSCG 32 is provided. Programmable spread spectrum control register 39 may, for example, include an enable bit. The content of the enable bit is supplied to an enable input lead (not shown) of 4-bit counter 69. A two-to-one analog multiplexer is also provided in the supply voltage path into variable delay element 45 such that a first data input lead of the analog multiplexer is coupled to the output of current mirror 44, a second data input lead of the analog multiplexer is coupled to the VDD supply, the output lead of the analog multiplexer is coupled to the control input lead 63 (supply voltage input lead) of variable delay element 45, and a select input lead of the analog multiplexer is coupled to receive the content of the enable bit of programmable spread spectrum control register 39. Programmable spread spectrum control register 39 powers up in a state such that 4-bit counter 69 is disabled and such that the propagation delay through variable delay element 45 is fixed. Disabling 4-bit counter 69 from counting reduces power consumption of the unused spread spectrum clock generator 32. Power consumption can be further reduced by cutting the VDD supply to the analog integrator and biasing circuit 42, and by cutting power to operational amplifier 90. Once the integrated circuit that embodies programmable SSCG 32 is operating, SSCG 32 can be enabled under software control by writing an appropriate value into programmable spread spectrum control register 39.

Although the present invention has been described in connection with certain specific embodiments for instructional purposes, the present invention is not limited thereto. Although a logic gate (in this case, an inverter) is set forth above as one example of a variable delay element, other types of variable delay elements can be used. A transistor may, for example, be placed in the path of periodic signal 37 such that a resistance through the transistor is varied to dither an RC time constant of the clock conductor used to conduct periodic signal 37 to processor 33. In other embodiments, the capacitance of the clock conductor is dithered. Control register 39 may be a one-time programmable register. Although the contents of control register 39 can be written by processor 33 in the example illustrated above, the contents of control register 39 is, in other embodiments, programmed at the time of fabrication of the integrated circuit and cannot be written by processor 33. The various bits of programmable spread spectrum control register 39 need not all be part of the same register, but rather can be separated from one another and can be independently written. In some embodiments, oscillator 31 is an external crystal oscillator, whereas in other embodiments oscillator 31 is a clock source disposed on the same integrated circuit as the spread spectrum clock generator and processor. Although a processor is described as the circuit that radiates unwanted EMI and that is clocked by periodic signal 37 in the illustrated example, other types of circuits can be the circuit that radiates unwanted EMI and that is clocked by periodic signal 37. The circuit that radiates EMI need not be an entirely digital circuit, but rather can be an analog circuit or can involve digital components and analog circuitry. A programmable spread spectrum clock generator can be embodied on any type of clocked integrated circuit that has EMI emission problems, including, but not limited to: microprocessor integrated circuits, high-speed programmable logic devices, high-speed bus interface circuitry, high-speed networking integrated circuits, high-speed graphics integrated circuits in televisions and other types of displays, high-speed integrated circuits in cell phones and in other electronic consumer devices.

In one method, a device embodying a programmable spread spectrum generator is initially tested to radiate electromagnetic radiation such that FCC EMI limits are exceeded. The spread spectrum control register is then written with a value so as to dither the frequency of output signal such that the emitted electromagnetic radiation drops such that the FCC EMI limits are not exceeded. Many different values can be written into the spread spectrum control register 39 such that the desired reduction in EMI is accomplished in a trial and error manner without an absolute understanding of the details of the physics involved. Once the contents of programmable spread spectrum control register 39 are known that result in satisfactory EMI emissions, then the programmable spread spectrum control registers of other identical devices are loaded with these same contents so that the EMI emissions of the other identical devices will also be satisfactory. Accordingly, various modifications, adaptations, and combinations of various features of the described embodiments can be practiced without departing from the scope of the invention as set forth in the claims.

What is claimed is:

1. A device comprising:
    a counter portion that receives a periodic signal and outputs a divided signal, wherein the periodic signal has periodic signal cycles with time durations, and wherein the divided signal has cycles; and
    a variable delay element that receives the periodic signal and outputs an output signal, wherein the output signal has output signal cycles whose time durations increase and decrease, and wherein from a first time when the divided signal is asserted until a second time when the divided signal is deasserted either no time durations of the output signal cycles increase or no time durations of the output signal cycles decrease.

2. The device of claim 1, wherein from the first time when the divided signal is asserted until the second time when the divided signal is deasserted all time durations of the output signal cycles either increase or decrease.

3. The device of claim 1, further comprising:
    an integrator that receives the divided signal and outputs a signal; and
    a non-linear signal generator that receives the signal output by the integrator and generates a non-linear signal having a magnitude, wherein one of the time durations of the output signal cycles is a function of the magnitude of the non-linear signal during that one time duration.

4. The device of claim 3, wherein the magnitude of the non-linear signal is a voltage magnitude.

5. The device of claim 1, wherein the variable delay element receives a control signal having a magnitude, and wherein one of the time durations of the output signal cycles is substantially proportional to the magnitude of the control signal during that one time duration.

6. The device of claim 5, wherein the magnitude of the control signal is a current magnitude.

7. A method comprising:
(a) receiving a periodic signal, the periodic signal having periodic signal cycles with corresponding time durations, wherein the time durations of the periodic signal cycles are substantially identical;
(b) generating a divided signal from the periodic signal, wherein the divided signal has cycles; and
(c) delaying the periodic signal and thereby generating an output signal, wherein the delaying is performed by a delay element, wherein the output signal has output signal cycles with corresponding time durations, wherein the time durations of the output signal cycles increase and decrease, and wherein from a first time when the divided signal is asserted until a second time when the divided signal is deasserted either no time durations of the output signal cycles increase or no time durations of the output signal cycles decrease.

8. The method of claim 7, further comprising:
(d) generating a control signal having a magnitude, wherein the magnitude of the control signal varies smoothly over a plurality of the periodic signal cycles, and wherein one of the time durations of the output signal cycles is a function of the magnitude of the control signal during that one time duration.

9. The method of claim 8, wherein the magnitude of the control signal is a current magnitude.

10. The method of claim 8, wherein the magnitude of the control signal varies in a quasi-sinusoidal manner over the plurality of the periodic signal cycles.

11. The method of claim 7, wherein the delay element is a variable delay element.

12. The method of claim 7, wherein the periodic signal is received from an external oscillator.

13. The method of claim 7, wherein the output signal is generated without using a phase locked loop.

14. The method of claim 7, further comprising, between (b) and (c):
(d) generating an intermediary signal with a magnitude, wherein the magnitude of the intermediary signal varies substantially linearly over a plurality of the periodic signal cycles;
(e) generating a non-linear signal from the intermediary signal; and
(f) generating a control signal from the non-linear signal, wherein the control signal has a magnitude that varies smoothly over the plurality of the periodic signal cycles, and wherein one of the time durations of the output signal cycles is a function of the magnitude of the control signal during that one time duration.

15. A device comprising:
a counter portion that receives a periodic signal and outputs a divided signal, wherein the divided signal has cycles with time durations; and
means for generating an output signal having output signal cycles whose time durations increase and decrease such that from a first time when the divided signal is asserted until a second time when the divided signal is deasserted either no time durations of the output signal cycles increase or no time durations of the output signal cycles decrease.

16. The device of claim 15, wherein the means does not include a phase locked loop.

17. The device of claim 15, wherein the means does not include a voltage controlled oscillator.

* * * * *